3,329,499
ELECTROPHOTOGRAPHIC PRINTING PROCESS USING A DIALKOXY ALUMINUM FATTY ACID SALT AS THE CROSS-LINKING CATALYST
Walter L. Garrett, Freeland, and Ralph E. Friedrich, Midland, Mich., assignors to The Dow Chemical Company, Midland, Mich., a corporation of Delaware
No Drawing. Filed Nov. 25, 1966, Ser. No. 596,818
3 Claims. (Cl. 96—1)

ABSTRACT OF THE DISCLOSURE

This invention relates to electrophotographic processing and more particularly relates to alkoxy aluminum fatty acid salts having special utility as non-gelling catalysts for use in promoting cross-linking of resin-containing photoconductive coatings in a method of developing electrostatic images on a photoconductive resin-containing surface by suspending said catalyst in a hydrocarbon liquid and contacting said liquid containing the catalyst with the electrostatic image to cross-link said resin to form an acid etch resist image. The disclosed process for preparing said alkoxy salts comprises in general reacting a primary alcohol with an aluminum fatty acid salt under alkaline conditions to form an alkoxy aluminum fatty acid salt, and separating the salt from the reaction mass.

---

This application is a continuation-in-part of application Ser. No. 286,506, filed June 10, 1963, now abandoned.

It has long been desired to rapidly produce high quality photoengraved printing plates. With the provision of the recently developed powderless etching process, disclosed, for example, in U.S. Letters Patent 2,828,194 and 3,152,083, at least some of these desires have been partially realized. In furtherance thereof, many processes have been disclosed to improve the photographic imaging qualities necessary in preparing acid etch-resist images. One such method is a process wherein a photoconductive zinc oxide is employed in a cross-linkable resin type insulating binder, such as, for example, SR–82 silicone intermediate resin (made by the General Electric Co.), as a photoconductive recording element on a base plate. Said element is then given an electric charge in subdued light, for example, by corona discharge means, followed by exposure to a light image, thereby producing a latent electrostatic image on said recording element, whereupon, it is developed by contact and subsequent heating with one or more catalyst materials, such as, for example, aluminum octanoate, which promote cross-linking of said binder to form an etch-resist image. Subsequently, said resist is subjected to the aforementioned powderless etching process to make a photoengraved printing plate. Such a method as described is disclosed and claimed in, for example, U.S. Letters Patent 3,231,374.

Though such a process as described above for preparing photoengraved plates apparently gives acceptable results, the use of the various catalysts as employed therein for cross-linking the resin binders, for example, aluminum octanoate, does not consistently produce quality etch-resist images.

Catalysts such as aluminum octanoate moreover produce relatively ragged images and deposit to some extent in nonimage areas causing pimples and imperfections in the developed plate. Moreover, catalysts such as aluminum octanoate, being well known gelling agents, when used in liquid developer solutions of hydrocarbon carrier liquids, such as n-heptane, cause gelation of the liquid within a very short time, for example, 3 to 4 hours. Accordingly, the useful life of such a liquid developer composition is extremely limited.

An object of the present invention, therefore, is to provide new and improved nongelling cross-linking catalysts for use in electrophotographic processes.

Another object of the present invention is to provide novel catalyst materials to promote cross-linking of resinous binders which will consistently produce high quality acid etch-resist images from photoconductive recording elements by employing said binders.

A further object of the invention is to provide a simple and economical process for preparing these novel cross-linking catalysts.

In general, the above and other objects and advantages can be obtained in accordance with the present invention by contacting aluminum salts of saturated fatty acids, such as, for example, commercially available aluminum octanoate, with one or more straight chained primary alcohols, for example, methanol, under alkaline conditions, thereby to form the novel alkoxy or mixed alkoxy aluminum fatty acid salts of the present invention, such as, for example, dimethoxy aluminum octanoate. These novel dialkoxy aluminum salts have been found to be highly desirable as cross-linking promoting catalysts in obtaining consistent, high quality, sharp and clear, acid-etch-resist images in recording elements used in the aforesaid electrophotographic processes. Moreover, these novel catalysts unexpectedly do not gel liquid hydrocarbons when mixed therewith, even after extremely prolonged periods of storage or standing, thereby providing a useful life to catalyst-containing developer solution or liquid developer concentrates of several weeks and months.

Specifically, the new and improved nongelling cross-linking catalyst of the present invention is prepared by contacting an aluminum fatty acid salt, the aliphatic fatty acid radical thereof having from 6 to 18 carbon atoms, with a primary alcohol, said alcohol having from 1 to 10 carbon atoms, while preferably saturating the resulting mixture with ammonia so as to maintain an alkaline reaction medium having an apparent pH of less than about 13. In addition, rather than ammonia, aliphatic or aromatic amines, such as, for example, diethylamine or aniline may be used in an amount sufficient to maintain alkalinity. Generally, the reaction is carried out over a period of from about 15 minutes to about 2 hours at a temperature within the range of from about 20° C. to about 250° C. but preferably from 25 to 50° C. for a period of about 1 hour. Though the reaction may be run over periods in excess of 2 hours, no particular advantage results in doing so. A reaction time and temperature of less than the minimum as stated above may be used; however, in doing so, a less than complete reaction is usually obtained.

When employing the longer chain alcohols, for example, those from 8 to 10 carbons, elevated temperatures (e.g. above 190° C.) may be used to increase the reaction rate.

The exact reaction temperature and time combination to be employed will be determined by the reaction rate and degree of completion desired, that is, the higher the temperature and time period, the greater is the reaction rate and completion. If temperatures above the boiling point of the reactants or reaction products are employed, the appropriate pressure equipment will be used.

Though the aforesaid alcohol and aluminum salt will react together, in substantially all proportions, an excess of alcohol is normally employed in the process of the present invention. Such excess, however, need only be sufficient to make a slurry of said salt in the alcohol. The alcohol and salt so-slurried facilitates the reaction rate. It is convenient, therefore, to employ an alcohol-to-salt weight ratio of from about 2.5 to about 8 or higher, with a ratio of about 5 being preferred. When stoichiometric amounts of said alcohol and salt are used, an inert diluent, such as, for example, benzene, is preferably used in an amount sufficient to obtain a slurry of the reactants.

A gentle agitation in the reactor vessel, though not necessary, is preferred. Such agitation may be provided by conventional means, such as, for example, an electrically driven paddle mixer, or an externally actuated magnetic agitation device.

Only one of the aforesaid alcohols is normally employed in preparing the aforesaid catalysts, however, combinations of said alcohols may also be employed, thereby making mixed alkoxy aluminum fatty acid salts, which are also highly desirable in promoting cross-linking of resins.

After the reaction has been carried out as above specified, the supernatent liquid is then separated from the alkoxy aluminum product as, for example, by filtration, preferably under suction, and washed with organic solvent, such as, for example, acetone, in which the product is not soluble, and air-dried for approximately 1 hour followed thereafter by drying in a partially evacuated oven for a period of time from approximately 1 to 15 hours at a temperature within the range of from about 75° to 100° C. Alcohols of the same kind as those used in the reaction may also be used as a wash solution; however, acetone is preferred.

After having prepared the novel nongelling catalyst of the present invention as specified above, it is normally used for developing latent electrostatic images, that is, in cross-linking the aforesaid resin binders to form an acid etch resist image. The novel catalyst is then suspended in a carrier liquid in which the catalyst is substantially insoluble, such as, for example, n-heptane, and flowing said liquid over a recording element having such a latent electrostatic image to be developed, followed by rinsing and heating to cure the cross-linked resin to a hard "resist." Images so-obtained are sharp and clear, are not ragged, and solid image areas are completely filled in. Of course, all the non-cross linked, non-resist background areas are washed away to expose the bare metal to be etched as aforesaid to finally produce a quality photoengraving plate for printing.

The following examples serve to further illustrate the present invention but are not intended to limit it thereto.

*Example I*

In accordance with the present invention, about 50 grams of a commercial grade aluminum octanoate produced by the Stresen and Reuter Co. of Bensenville, Ill., was admixed with about 500 ml. (400 grams) of redistilled methanol in a 1000 ml. container. The mixture was then saturated with anhydrous ammonia by bubbling, and slowly agitated for about 60 minutes at about 28° C., thereby forming an insoluble product of dimethoxy aluminum monooctanoate. After quiescence for about 15 minutes, the supernatant liquid was decanted and the so-formed insoluble alkoxy product washed in a Buchner funnel with about 1500 ml. of acetone. Thereafter, the product was air dried at about the above temperature for about 60 minutes and further dried for about 15 hours in a partially evacuated oven at about 80° C.

Upon being analyzed, the alkoxy product was found to be a non-crystalline, white powder having an elemental analysis by weight of 11.42 percent aluminum, 52.04 percent carbon, 9.17 percent hydrogen, and 27.37 percent oxygen, having a molecular weight of about 232, and a melting point of from about 310 to about 320 centigrade degrees. In addition, the product, upon being examined by infrared analysis, showed an absorption at 3.51 microns, being characteristic of —O—CH$_3$ (methoxy) groups. In view of the above elemental analysis, the spectrum of the dimethoxy aluminum monooctanoate indicated a probable structure of

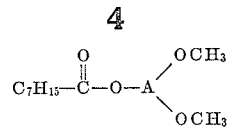

In order to determine its effectiveness as a cross-linking promoting catalyst for resins such as SR–82 resin, a portion of the above material was suspended in a carrier liquid of n-heptane and the suspension used in accordance with the above-described electrophotographic process. High quality etch-resist images were consistently produced. Furthermore, the dimethoxy aluminum octanoate product when suspended in the carrier liquid caused no gelation of said liquid even after prolonged periods of, for example, 30 days and more, thus illustrating that it is not a gelling agent as is aluminum octanoate, the latter being commerically used as a gelling agent for hydrocarbon liquids.

*Example II*

About 10 grams of commercial grade aluminum stearate was reacted with about 160 grams of methyl alcohol saturated with anyhdrous ammonia at a temperature of about 65° C. A white insoluble non-crystalline product of dimethoxy aluminum stearate was obtained and was evaluated as a cross-linking catalyst similarly as in Example I, whereupon, it was found to consistently produce etch-resist images. In addition, when employed in a carrier liquid of n-heptane for prolonged periods, it caused no gelation of said liquid.

*Example III*

Similarly as in Examples I and II above, ammoniacal ethyl, propyl, butyl, pentyl, hexyl, heptyl, octyl, nonyl, and decyl alcohol is reacted in accordance with the present invention with aluminum hexanoate, heptanoate, octanoate, nonanoate, decanoate, hendecanoate, dodecanoate, tetradecanoate, hexadecanoate, or aluminum octadecanoate to produce the corresponding dialkoxy aluminum fatty acid salt. Each of these alkoxy products produces etch-resist images. Further, none of these materials, when suspended in a carrier liquid, such as n-heptane, for prolonged periods, causes gelation thereof.

*Example IV*

In a manner similar to that of the foregoing examples, 50 grams of aluminum octanoate were reacted with 500 cubic centimeters of octanol-1 in the presence of a saturating amount of anhydrous ammonia. The mixture was slowly agitated for 60 minutes at about 28° C. thereby forming an insoluble product of dioctoxy aluminum monooctanoate. In the manner of the foregoing examples, this product was separated and found to be a non-crystalline white powder which infrared analysis confirmed as having the probable structure dioctoxy aluminum monooctanoate. This nongelling material, as well as the other catalysts of the invention, is also effective as a cross-linking promoting catalyst for use in the above-described electrophotographic process employing, for example, silicone intermediate resins such as the aforesaid SR–82 resin, Z–6018 silicone resin (made by Dow Corning Corp.), and, for example, epoxy resins of diglycidyl ether of bisphenol–A having an epoxide equivalent weight of from 475 to 2000, and other suitable resinous binders.

The present invention may be modified or changed without departing from the spirit or scope thereof, and it is understood that the invention is only limited as defined in the appended claims.

We claim:

1. In an electrophotographic method of preparing etchable printing plates employing a photoconductive zinc oxide in a cross-linkable resin-type insulating binder as a photoconductive recording element which includes charging said recording element with an electrostatic charge, exposing the so-charged element to a light image thereby forming a latent electrostatic image thereon, developing said electrostatic image by contact and subsequent heating with a catalyst material which promotes cross-linking of said cross-linkable binder to form an etch resist image; the improvement which includes using a dialkoxy aluminum fatty acid salt as the cross-linking catalyst wherein each alkoxy group of said salt contains from 1 to 10, inclusive, carbon atoms, and the fatty acid radical of said salt contains from 6 to 18, inclusive, carbon atoms.

2. The improvement of claim 1 wherein dimethoxy aluminum mono-octanoate is used as the cross-linking catalyst.

3. The improvement of claim 1 wherein dimethoxy aluminum stearate is used as the cross-linking catalyst.

References Cited

UNITED STATES PATENTS

| 2,932,659 | 4/1960 | Orthner et al. | 260—414 |
| 3,231,374 | 1/1966 | Sciambi | 96—1 |

NORMAN G. TORCHIN, *Primary Examiner.*

C. E. VAN HORN, *Assistant Examiner.*